United States Patent Office 3,250,675
Patented May 10, 1966

3,250,675
SOIL TREATING OR SEED DRESSING AGENTS FOR COMBATTING PHYTOPATHOGENIC FUNGI
Paul-Ernst Frohberger, Burscheid, Germany, and Walter Zeck, Vero Beach, Fla., assignors to Farbenfabriken Bayer Aktiengesellschaft, Leverkusen, Germany, a German corporation
No Drawing. Filed Jan. 22, 1963, Ser. No. 253,029
Claims priority, application Germany, Feb. 21, 1962, F 36,081
5 Claims. (Cl. 167—38)

Phenylchlorophenols and their metal salts are already known as disinfectant and preservative agents (cf. U.S. Patent specification No. 2,014,720). Their special application for various purposes has also been described frequently in patent specifications. Thus, for example, the use of sodium chloro-2-phenylphenolate and sodium-2-chloro-4-phenylphenolate is described for the production of fungicidal and bactericidal parchment paper in French patent specification 1,119,356. In German patent specification No. 895,671 the use of chloro substitution products of 2- or 4-hydroxydiphenyl as protecting agent against termite attack has been described. In French patent specification 1,137,420 hydroxyaryl compounds such as p-phenylchlorophenol and o-phenylchlorophenol are proposed as textile preservatives. In German patent specification 1,114,314 a process for the production of termite-proof rubber articles with chlorinated hydroxydiphenyls is described. Finally the use of 2-hydroxy-3-chlorodiphenyl and 2-hydroxy-5-chlorodiphenyl for preserving fruits and other agricultural products as well as packing materials is mentioned in British patent specification No. 778,627, French patent specification No. 1,131,160 and German patent specification No. 1,043,777.

Although the antiseptic and germicidal activity of the phenylchlorophenols has been known for more than 25 years, they have, as is apparent from the relevant literature, found application in the field of plant protection only for antiseptic treatment of agricultural products such as fruit and potatoes. Only the unsubstituted sodium phenyl phenolate has been applied for chemotherapeutic soil treatment (cf. Rev. of Appl. Mycol. 30, pages 372, 373 and 381 [1951]).

It is now surprisingly discovered that the known phenylchlorophenols and their metal salts are suitable for combatting plant diseases through treatment of soil and seeds.

The most effective phenyl chlorophenols are the 2-phenyl-6-chlorophenol and the 2-phenyl-4-chlorophenol as well as mixtures thereof. The phenols can also be applied in form of their metal salts preferably in the form of the alkali metal salts, such as lithium, sodium and potassium salts, and further in the form of their alkaline earth metal salts, such as the calcium, barium and magnesium salts.

If they are introduced into the soil as solutions, emulsions, suspensions, powders or granules, and are there distributed, they prevent the attack of pathogenic soil organisms on cultivated plants in every stage of development. They possess a certain volatility, so that the gas phase augments their distribution in the soil. Their water solubility facilitates, moreover, a further distribution with the movement of the ground water. Leaching out of the substances from the soil is prevented by attachment to the soil colloids. They are tolerated by most cultivated plants without harm in effective concentrations in the soil, so that sowing or planting of the soil can take place immediately after treatment. The prolonged effect of these substances in the soil prevents rapid re-infection with pathogenic soil fungi. Corresponding preparations of phenylchlorophenolates can be used with similar success for seed dressing, whereby seed-born plant diseases are likewise eliminated, while the germinating seeds are protected against pathogenic soil organisms.

The preparations can be applied in the aforementioned forms of preparation alone or in combination with other plant protection agents or other cultivation aids such as e.g. fertilizers or soil structure improvers.

The following examples are given for the purpose of illustrating the invention.

EXAMPLE 1

Activity as soil treating agent

Heat-sterilised Fruhstorf standard earth was inoculated with pure mycelium cultures of the soil fungus *Rhizoctonia solani* and mixed with the given preparations in the stated amounts. Immediately after inoculation and treatment of the earth, sowing was carried out of peas 1 cm. deep. At temperatures of 20–22° C. and optimum soil moisture, the seeds were given the chance to germinate. In uninoculated soil or in inoculated and successfully treated soil, healthy pea plants developed from the seeds. By attack of the soil fungus the germinated plants reached the surface either not at all or only in a severely rotted state. The evaluation of healthy and diseased plants took place 3 weeks after sowing.

Table 1

| Active agent | Active agent concentration in soil, mg./l. | Number of healthy plants in percent, 3 wks. after sowing |
|---|---|---|
| Fruhstorf standard earth, sterilised:<br>Untreated | | 96 |
| Fruhstorf standard earth, sterlised and inoculated with *Rhizoctonia solani*:<br>Untreated | | 0 |
| Mixture of:<br>15% 2-phenyl-6-chlorophenol<br>plus | 25 | 38 |
| 5% 2-phenyl-4-chlorophenol<br>plus | 100 | 94 |
| 4% NaOH<br>plus | | |
| rest water | | |

EXAMPLE 2

Application as dressing (a) *Against soil fungi.*—In a similar manner to the determination of the activity against *Rhizoctonia solani* as soil treating agent, testing of effectiveness as a dressing was carried out. Instead of the soil treatment, however, seed treatment was performed in this case. The active substances were mixed with an equivalent amount of a sodium hydroxide solution and employed in the usual way in aqueous solution in the stated concentrations and amounts.

*Table 2*

| Active agents | Active agent concentration of dressing, percent | Dressing Amount applied in ml./kg. seeds | Number of healthy plants in percent three weeks after sowing |
|---|---|---|---|
| Fruhstorf standard earth, sterilised: Untreated | | | 92 |
| Fruhstorf standard earth, sterilised and inoculated with *Rhizoctonia solani*: Untreated | | | 50 |
| Mixture of: | | | |
| 15 parts [1] 2-phenyl-6-chlorophenol | 1 | 10 | 52 |
| plus | | | |
| 5 parts 2-phenyl-4-chlorophenol | 3 | 10 | 72 |
| plus | | | |
| 4 parts NaOH | 10 | 10 | 92 |
| plus | | | |
| 20 parts ethanol | | | |
| plus | | | |
| rest water | | | |
| 20 parts 2-phenyl-6-chlorophenol | 1 | 10 | 70 |
| plus | | | |
| 4 parts NaOH | 3 | 10 | 84 |
| plus | | | |
| 20 parts ethanol | 10 | 10 | 82 |
| plus | | | |
| rest water | | | |

[1] Parts by weight.

(b) *Against seed-born fungus.*—Sugar beet seeds, naturally infected with *Phoma betae*, which provokes beetroot blight, were dressed in the usual way with the stated preparations and quantities. Sowing was performed 1 cm. deep in practically sterile quartz sand, whereby soil-born infections were excluded. At temperatures of about 12° C. the germination of the beet ball took place in the greenhouse. The mean activity was determined 4 weeks after sowing by counting the healthy plants present in each case among 200 beet balls with several germinations.

*Table 3*

| Active agent | Active agent concentration in dressing, percent | Dressing amount applied in ml./kg. seeds | Number of healthy plants 4 wks. after sowing, referred to 100 beet balls |
|---|---|---|---|
| Untreated | | | 46.5 |
| Mixture of: | | | |
| 15 parts by wt. 2-phenyl-6-chlorophenol | 0.5 | 60 | 89.0 |
| plus | | | |
| 5 parts 2-phenyl-4-chlorophenol | 1.5 | 60 | 139.0 |
| plus | | | |
| 20 parts ethanol | 5 | 60 | 170.0 |
| plus | | | |
| 4 parts NaOH | | | |
| plus | | | |
| rest water | | | |
| 20 parts 2-phenyl-6-chlorophenol | 0.5 | 60 | 92.0 |
| plus | | | |
| 20 parts ethanol | 1.5 | 60 | 133.5 |
| plus | | | |
| 4 parts NaOH | 5 | 60 | 176.5 |
| plus | | | |
| rest water | | | |

We claim:
1. A method for controlling soil infestation with phytopathogenic fungi comprising introducing into soil an effective amount of at least one active ingredient selected from the group consisting of 2-phenyl-6-chlorophenol, 2-phenyl-5-chlorophenol and the corresponding alkali and alkaline earth metal salts.
2. The process of claim 1 wherein the active ingredient is the sodium salt of 2-phenyl-4-chlorophenol.
3. The process of claim 1 wherein the active ingredient is the sodium salt of 2-phenyl-6-chlorophenol.
4. The process of claim 1 wherein the active ingredient is a mixture of the sodium salt of 2-phenyl-6-chlorophenol and 2-phenyl-4-chlorophenol.
5. A method for dressing seed, for protection vs. phytopathogenic fungi comprising treating the seed with a composition containing as active ingredient, a member selected from the group consisting of 2-phenyl-6-chlorophenol, 2-phenyl-4-chlorophenol and the corresponding alkali and alkaline earth metal salts.

References Cited by the Examiner

UNITED STATES PATENTS

| 2,014,720 | 9/1935 | Christiansen et al. | 167—31 |
| 2,941,921 | 6/1960 | Darlington | 167—31 |
| 3,002,883 | 10/1961 | Butt et al. | 167—31 |

OTHER REFERENCES

Rev. of Appl. Mycol., vol. 30, pp. 372, 373 and 381 (1951).

JULIAN S. LEVITT, *Primary Examiner.*